United States Patent
Storer et al.

(10) Patent No.: US 12,097,457 B2
(45) Date of Patent: Sep. 24, 2024

(54) ADJUSTABLE ABRASIVE AND DUST SEPARATOR

(71) Applicant: Media Blast & Abrasive, Inc., Brea, CA (US)

(72) Inventors: Ronald D. Storer, Villa Park, CA (US); Robert A. Robinson, Glenwood, NM (US)

(73) Assignee: Media Blast & Abrasive, Inc., Brea, CA (US)

( * ) Notice: Subject to any disclaimer, the term of this patent is extended or adjusted under 35 U.S.C. 154(b) by 0 days.

(21) Appl. No.: 18/186,423

(22) Filed: Mar. 20, 2023

(65) Prior Publication Data

US 2023/0226477 A1     Jul. 20, 2023

Related U.S. Application Data

(62) Division of application No. 17/384,105, filed on Jul. 23, 2021, now Pat. No. 11,633,685, which is a
(Continued)

(51) Int. Cl.
*B24C 9/00*        (2006.01)
*B01D 45/12*     (2006.01)
(Continued)

(52) U.S. Cl.
CPC ............. *B01D 46/02* (2013.01); *B01D 45/12* (2013.01); *B01D 45/16* (2013.01); *B04B 1/06* (2013.01);
(Continued)

(58) Field of Classification Search
CPC ......... B24C 3/065; B24C 9/003; B24C 9/006; B04B 1/06; B01D 45/02; B01D 45/12; B01D 45/16
(Continued)

(56) References Cited

U.S. PATENT DOCUMENTS 1,751,719 A    3/1930   Uhri, Jr.
1,940,539 A    12/1933   Fritsche
(Continued)

OTHER PUBLICATIONS

Media Blast & Abrasives, Inc.; "High Quality Media Blast Cabinets"; 12 pages.
(Continued)

*Primary Examiner* — Eileen P Morgan
(74) *Attorney, Agent, or Firm* — Stetina Brunda Garred & Brucker (57) ABSTRACT

Provided is a centrifuge media separator for separating blast particulate from fine particulate carried by air flowing from a blast cabinet and through the media separator. The centrifuge media separator comprises an upper panel, a lower panel, and an outer wall. The upper panel has a central opening formed therein. The outer wall is configured in a truncated logarithmic shape and which extends between the upper and lower panels. The outer wall has at least one particulate escape aperture formed therein. The upper panel, lower panel and outer wall collectively define a curvilinear air passageway having an inlet and an outlet. An air foil extends from the outer wall in to the air passageway. The distance than the air foil extends in to the air passageway is adjustable. The inlet is configured to allow a flow of air to enter the air passageway and circulate therethrough toward the outlet. The escape aperture is configured to exhaust the blast particulate out of the passageway. The central opening is configured to exhaust the fine particulate out of the passageway.

11 Claims, 6 Drawing Sheets

Related U.S. Application Data division of application No. 15/858,919, filed on Dec. 29, 2017, now abandoned.

(51) Int. Cl.

| | | |
|---|---|---|
| *B01D 45/16* | (2006.01) | |
| *B01D 46/02* | (2006.01) | |
| *B04B 1/06* | (2006.01) | |
| *B04C 1/00* | (2006.01) | |
| *B24C 7/00* | (2006.01) | |
| *B24C 5/06* | (2006.01) | |

(52) U.S. Cl.
CPC .............. *B04C 1/00* (2013.01); *B24C 7/0015* (2013.01); *B24C 9/003* (2013.01); *B24C 9/006* (2013.01); *B24C 5/062* (2013.01)

(58) Field of Classification Search
USPC .......................................................... 451/88
See application file for complete search history.

(56) References Cited

U.S. PATENT DOCUMENTS

| | | | |
|---|---|---|---|
| 2,299,405 A | 12/1933 | Prange | |
| 1,953,058 A * | 4/1934 | Andrews ................... | B07B 7/01 |
| | | | 209/143 |
| 2,324,250 A | 7/1943 | Voerge | |
| 2,376,287 A | 5/1945 | Sorrentino | |
| 2,376,616 A | 5/1945 | Oechsle et al. | |
| 2,387,193 A | 10/1945 | Swenarton | |
| 2,440,643 A | 4/1948 | Pettinos | |
| 2,450,401 A | 9/1948 | Thompson | |
| 2,462,480 A | 2/1949 | Eppler | |
| 2,483,956 A | 10/1949 | Workman | |
| 2,587,184 A | 2/1952 | Marjama | |
| 2,669,809 A | 2/1954 | McGrath | |
| 2,717,476 A | 9/1955 | Myers | |
| 3,328,925 A | 7/1967 | Hewitt | |
| 3,424,386 A | 1/1969 | Maasberg et al. | |
| 3,516,205 A | 6/1970 | Thomson | |
| 3,624,966 A | 12/1971 | Palmer et al. | |
| D231,852 S | 6/1974 | Walsh et al. | |
| 3,906,674 A | 9/1975 | Stone | |
| 3,923,481 A * | 12/1975 | Farrow ................... | B01D 45/12 |
| | | | 55/398 |
| D239,155 S | 3/1976 | Kent et al. | |
| 3,953,184 A * | 4/1976 | Stockford .............. | B01D 45/12 |
| | | | 55/458 |
| 3,970,437 A | 4/1976 | Van Diepenbroek et al. | |
| D241,756 S | 10/1976 | Gray | |
| 4,026,687 A | 5/1977 | Berz | |
| 4,047,907 A | 9/1977 | Knutsson et al. | |
| 4,048,918 A | 9/1977 | Peck | |
| D246,108 S | 10/1977 | Ashworth | |
| 4,099,937 A | 7/1978 | Ufken et al. | |
| D250,196 S | 11/1978 | Caccioli et al. | |
| 4,140,502 A | 2/1979 | Margraf | |
| 4,144,043 A | 3/1979 | Johnston | |
| 4,156,600 A | 5/1979 | Jacobson | |
| 4,201,256 A | 5/1980 | Truhan | |
| 4,202,142 A | 5/1980 | Van Fossen | |
| 4,212,653 A * | 7/1980 | Giles ....................... | B01D 45/16 |
| | | | 209/716 |
| 4,223,748 A | 9/1980 | Barendsen | |
| 4,230,468 A | 10/1980 | Rebours et al. | |
| 4,233,785 A | 11/1980 | Abell | |
| D257,774 S | 1/1981 | Pierson | |
| 4,244,715 A | 1/1981 | Eisenbarth | |
| 4,253,610 A | 3/1981 | Larkin | |
| 4,266,673 A | 5/1981 | Haidlen et al. | |
| 4,272,260 A | 6/1981 | Klein et al. | |
| 4,275,531 A | 6/1981 | Van Fossen | |
| 4,279,743 A * | 7/1981 | Miller ................... | B03D 1/1425 |
| | | | 209/731 |
| 4,281,485 A | 8/1981 | Charity, III | |
| 4,285,707 A * | 8/1981 | Pfenninger ............. | B07B 7/086 |
| | | | 55/396 |
| 4,286,974 A | 9/1981 | Schminke et al. | |
| 4,300,318 A | 11/1981 | Brown | |
| 4,330,400 A * | 5/1982 | Schmidt .................... | B07B 4/08 |
| | | | 209/34 |
| 4,336,040 A | 6/1982 | Haberi | |
| 4,342,576 A * | 8/1982 | Seki ....................... | B01D 45/12 |
| | | | 55/452 |
| 4,348,057 A | 9/1982 | Parenti et al. | |
| 4,360,990 A | 11/1982 | Hubbard et al. | |
| 4,416,673 A | 11/1983 | Kirchen et al. | |
| D274,851 S | 7/1984 | Schmitz | |
| 4,543,111 A | 9/1985 | Muller et al. | |
| 4,585,466 A * | 4/1986 | Syred ........................ | B04C 5/08 |
| | | | 55/349 |
| 4,655,806 A | 4/1987 | Bowersox | |
| 4,657,567 A * | 4/1987 | Callgren ................... | B03C 3/10 |
| | | | 96/40 |
| 4,673,424 A | 6/1987 | Range | |
| 4,689,923 A | 9/1987 | Goudeaux et al. | |
| 4,771,580 A | 9/1988 | Male | |
| 4,792,382 A | 12/1988 | Lorenz et al. | |
| 4,878,927 A | 11/1989 | Margraf | |
| 4,894,959 A | 1/1990 | Hoover | |
| 4,984,397 A | 1/1991 | VanLeeuwen | |
| D323,661 S | 2/1992 | Zwicker | |
| 5,089,037 A | 2/1992 | Marsolais | |
| 5,185,968 A | 2/1993 | Lyras | |
| 5,221,300 A | 6/1993 | Hoogland et al. | |
| 5,271,751 A | 12/1993 | Lagler | |
| D343,640 S | 1/1994 | Thies | |
| D343,706 S | 1/1994 | Gurstein | |
| D343,888 S | 2/1994 | Rupp | |
| 5,297,363 A | 3/1994 | Schroder | |
| 5,312,040 A | 5/1994 | Woodward | |
| 5,319,894 A | 6/1994 | Shank, Jr. | |
| D352,808 S | 11/1994 | McNeil | |
| D354,799 S | 1/1995 | Self | |
| D360,017 S | 7/1995 | Lopez | |
| 5,433,653 A | 7/1995 | Friess | |
| D361,177 S | 8/1995 | Hoover | |
| 5,490,807 A | 2/1996 | Marchell | |
| 5,512,005 A | 4/1996 | Gulung | |
| D370,490 S | 6/1996 | Zwicker | |
| 5,584,901 A | 12/1996 | Bakharev et al. | |
| 5,676,589 A | 10/1997 | Ashworth | |
| 5,690,709 A | 11/1997 | Barnes | |
| 5,716,260 A | 2/1998 | Griffin et al. | |
| D394,526 S | 5/1998 | Strandell | |
| 5,761,764 A | 6/1998 | Fiegel et al. | |
| 5,800,246 A | 9/1998 | Tomioka | |
| D400,212 S | 10/1998 | Brassil et al. | |
| 5,839,951 A | 11/1998 | Tomioka | |
| 5,975,996 A | 11/1999 | Settles | |
| 5,983,840 A | 11/1999 | Riccius et al. | |
| 6,051,054 A | 4/2000 | Ahman | |
| 6,195,837 B1 | 3/2001 | Vanderlinden | |
| 6,224,645 B1 | 5/2001 | Rydin et al. | |
| 6,251,051 B1 | 6/2001 | Chen | |
| 6,254,362 B1 | 7/2001 | Higuchi et al. | |
| 6,319,295 B1 | 11/2001 | Tojner | |
| 6,346,035 B1 | 2/2002 | Anderson et al. | |
| 6,431,965 B1 | 8/2002 | Jones et al. | |
| 6,521,051 B1 | 2/2003 | Lutich | |
| D476,668 S | 7/2003 | Storer et al. | |
| D482,827 S | 11/2003 | Storer et al. | |
| D482,828 S | 11/2003 | Storer et al. | |
| D489,794 S | 5/2004 | Storer et al. | |
| 6,833,016 B2 | 12/2004 | Witter | |
| 7,008,304 B1 * | 3/2006 | Robinson ................ | B24C 9/003 |
| | | | 451/87 |
| D534,557 S | 1/2007 | Storer et al. | |
| 9,623,539 B2 | 4/2017 | Robinson | |
| 10,493,390 B2 * | 12/2019 | Roston ................... | B01D 45/16 |
| 2003/0014954 A1 * | 1/2003 | Ronning ................. | B01D 45/12 |
| | | | 55/345 |

(56) References Cited

U.S. PATENT DOCUMENTS

| | | | |
|---|---|---|---|
| 2003/0085158 A1* | 5/2003 | Oirschot | B07B 7/04 |
| | | | 209/139.1 |
| 2003/0124955 A1 | 7/2003 | Hanson | |
| 2004/0092216 A1 | 5/2004 | Publ et al. | |
| 2006/0040596 A1* | 2/2006 | Robinson | B04C 1/00 |
| | | | 451/87 |
| 2012/0077423 A1 | 3/2012 | Pei | |
| 2018/0078890 A1* | 3/2018 | Roston | B01D 45/16 |
| 2020/0230527 A1* | 7/2020 | Bayati | B01D 21/2483 |

OTHER PUBLICATIONS

"Pipe Restoration—Air Filter"; 4 pages.
"Pipe Restoration—Main Header"; 6 pages.
"PT1001—User Manual"; 4 pages.

* cited by examiner

ADJUSTABLE ABRASIVE AND DUST SEPARATOR

CROSS-REFERENCE TO RELATED APPLICATIONS

The present application is a divisional application of U.S. patent application Ser. No. 17/384,105, filed Jul. 23, 2021, which is a divisional application of U.S. patent application Ser. No. 15/858,919, filed Dec. 29, 2017, the entire disclosure of which is expressly incorporated herein by reference.

STATEMENT RE: FEDERALLY SPONSORED RESEARCH/DEVELOPMENT

Not Applicable

BACKGROUND

The present invention relates generally to blast cabinets and, more particularly, to a uniquely configured centrifuge media separator that may be included with the blast cabinet and which is specifically adapted to separate blast particulate of various masses from fine particulate such that the blast particulate may be recycled through the blast cabinet while the fine particulate may be removed from the blast cabinet in order to improve the visibility of a workpiece being blasted within the blast cabinet.

Blast cabinets are typically utilized to clean or generally prepare surfaces of a workpiece by directing high pressure fluid containing abrasive blast media or blast particulate toward the workpiece. The abrasive blast particulate is typically a relatively hard material such as sand, sodium bicarbonate (i.e., baking soda), metallic shot or glass beads although many other materials may be selected for use as the blast particulate. These media may have differing masses, and therefore differing momentums when moved by an air flow of a given velocity. The blast cabinet typically includes a housing supported on legs. The housing defines a generally air tight enclosure having a pair of arm holes with gloves hermetically sealed thereto such that an operator may manipulate a blast hose and/or the workpiece for blasting thereof within the enclosure. The blast hose is configured to direct the high pressure fluid such as air carrying the blast particulate at high velocity toward the workpiece surfaces. The blast cabinet typically includes a transparent window to allow the operator to manipulate the workpiece and to visually observe the progress of the blasting.

During blasting, the blast particulate bounces off of the workpiece and is generally violently thrown about within the enclosure such that a portion of the blast particulate normally breaks down into smaller dust-like particles hereinafter referred to as fine particulate. In addition, surface coatings, dirt and scale that are abraded from the workpiece by the blast media contribute to the formation of fine particulate within the enclosure. The fine particulate is too small to be effective as a blast medium and therefore must be eventually removed from the blast cabinet. In addition, the fine particulate is of such small size such that it may be suspended in the air within the enclosure of the blast cabinet. Over time, the gradual buildup of the fine particulate can create a foggy or clouded environment within the enclosure which visually impairs or obstructs the operator's view of the workpiece. Due to health and safety regulations and environmental restrictions, the particulate-filled air cannot simply be exhausted to the atmosphere. Rather, the particulate-filled air must be filtered prior to exhaustion in order to remove the fine particulate carried therein.

Accordingly, many prior art blast cabinets are ventilated and include filters such that at least a portion of the fine particulate may be purged from the air. Prior art cabinets having the capability to purge fine particulate from air prior to its exhaustion out of the enclosure in order to improve the operator's visibility of the workpiece within the enclosure have been made. These blast cabinets separate blast particulate from fine particulate such that the blast particulate may be recycled through the blast cabinet. These blast cabinets also incorporate a centrifuge media separator which eliminates the need for a filter.

However, because the differing masses of blast media, the principle of operation of the state of the art blast cabinets is such that the blast cabinets work most effectively with higher mass blast media. Cost of higher mass blast media may make lower mass blast media more desirable. In addition, environmental regulation of a particular geographic location may dictate the use of lower mass blast media. Offering the flexibility for the same blast cabinet to use blast media of differing masses offers tremendous advantages.

BRIEF SUMMARY

In accordance with the present disclosure, there is provided a blast cabinet for blasting the surface of a workpiece with blast media, the blast cabinet may comprise a housing, and blast media placed within the housing. The blast cabinet may also include a centrifuge media separator. The centrifuge media separator may include a top panel, a bottom panel, an inner wall extending downwardly from the top panels, and an outer wall including surrounding the inner wall and extending between the top and bottom panels, the outer wall may define a truncated logarithmic spiral. The top panel, the bottom panel, inner wall, and outer wall may collectively define a passageway and a central opening, the passageway may have an inlet and an outlet and a transverse cross section which may generally decrease from the inlet to the outlet. The centrifuge media separator may further have an escape aperture in the outer wall, and an air foil adjacent the escape aperture, the air foil extending from the outer wall in to the passageway a distance, the distance being adjustable between a minimum and a maximum.

There is further provided in the present disclosure a centrifuge media separator for separating blast media from fine particulate matter when both the blast media and fine particulate matter are carried in an air flow. The centrifuge media separator may include a top panel, a bottom panel, an inner wall which may extend from the top panel and may defining a gap between the inner wall and the bottom panel, and an outer wall which may include an escape aperture. The outer wall may surround the inner wall and extend between the top and bottom panels. The outer wall may define a truncated logarithmic spiral. The centrifuge media separator may include an air foil. The air foil may include a leading edge. The air foil may be attached to the outer wall and the leading edge may be angled in a direction opposite the air flow to direct a portion of the air flow to the escape aperture. The top panel, the bottom panel, inner wall, and outer wall may collectively define a passageway. The passageway may have an inlet and an outlet, and the passageway may have a transverse cross section which may generally decrease from the inlet to the outlet. When the blast media and fine particulate matter enter the passageway at the inlet, and are carried by the airflow toward the outlet, the configuration of the passageway may cause fine particulate matter to be closer to the inner wall than the blast media, and the air foil may extend from the outer wall in to the passageway a distance to intercept the blast media and may direct the blast media to the escape aperture, the air foil may be adjustable to vary the distance between a minimum and a maximum.

There is further provided in the present disclosure a method of forming a centrifuge media separator for separating blast media from fine particulate matter when both the blast media and fine particulate matter are carried in an air flow. The method may include providing a top panel, providing a bottom panel, providing an inner wall including a top edge and a bottom edge;

attaching the top panel to the top edge of the inner wall such that there is a gap between the bottom edge and the bottom panel;

providing an outer wall including an escape aperture, an upper edge, and a lower edge;

attaching the outer wall so that the outer wall surrounds the inner wall and the upper edge attaches to the top panel and the lower edge attaches to the bottom panel, the outer wall defining a truncated logarithmic spiral; and attaching an air foil to the outer wall, the air foil including a leading edge and adjustment slots, the adjustment slots including a first end and a second end, and the leading edge being angled in a direction opposite the air flow to direct a portion of the air flow to the escape aperture;

wherein the top panel, the bottom panel, inner wall, and outer wall collectively define a passageway, the passageway having an inlet and an outlet, and a transverse cross section which generally decreases from the inlet to the outlet, and the air foil is adjustable from the first end to the second end of the adjustment slots to move the leading edge from closer to the outer wall to further away from the outer wall.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of certain embodiments of a machining tool assembly for a firearm lower receiver and is not intended to represent the only forms that may be developed or utilized. The description sets forth the various structure(s) and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Figure 1:
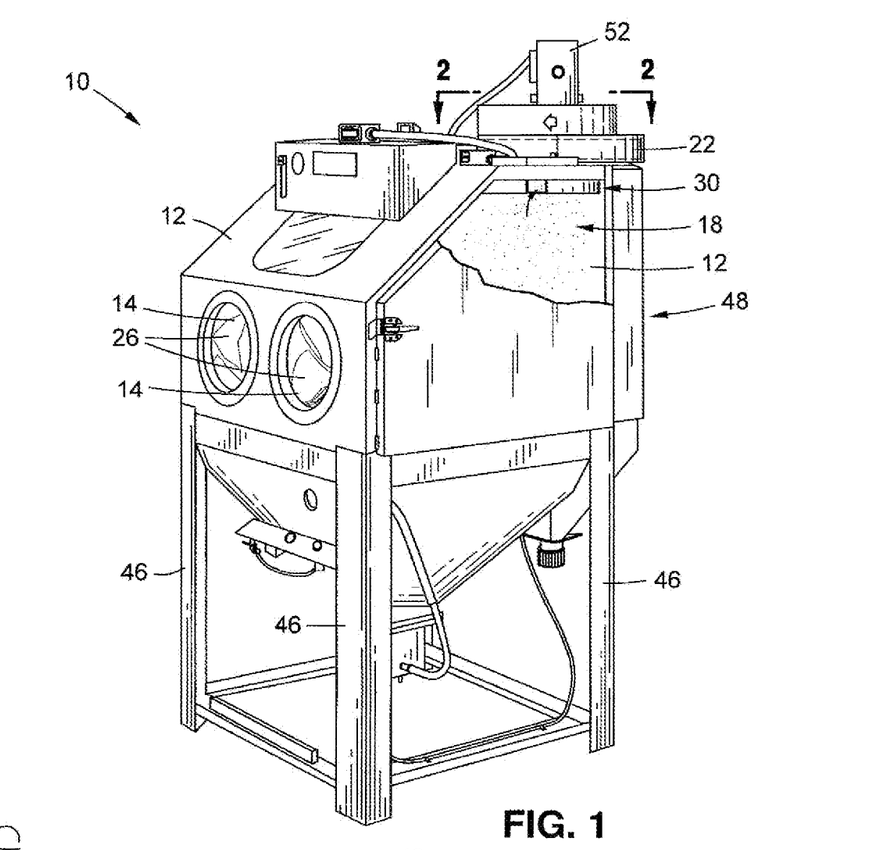
FIG. 1 is a perspective view of a blast cabinet having a centrifuge media separator of the present invention incorporated therein.

Referring to FIG. 1, shown is the blast cabinet 10 including a centrifuge media separator 30 incorporated therein. The blast cabinet 10 may be comprised of a housing 48 supported on legs 46. A section of the housing 48 may have a generally inverted pyramid shape such that spent blast particulate 18 may be funneled downwardly toward a lower portion of the housing 48 and subsequently picked up by the high pressure source (not shown) for recycling through the blast cabinet 10. The housing 48 has a generally air tight enclosure 12 with arm holes 26 to which two hermetically sealed gloves 14 may be attached. The housing 48 also includes a transparent window 16 such that an operator may reach though the arm holes 26 to grasp and/or manipulate the workpiece 24 during blasting thereof with the pressure hose.

The housing 48 of the blast cabinet 10 may also include at least one door allowing access into the enclosure 12 such that the workpiece 24 may be inserted therein and removed therefrom. The pressure hose is a conduit for a high pressure, high velocity fluid. The fluid acts as a carrier medium and carries blast particulate 18 for high velocity discharge onto surfaces of the workpiece 24 in order to remove coatings from or otherwise prepare the workpiece 24 surfaces, as will be described in greater detail below. The fluid may be a gas such as air as may be utilized in the blast cabinet 10 of FIG. 1. However, the fluid may also be a liquid such as water. While the specific construction of the blast cabinet 10 is as shown in FIG. 1, it should be noted that the centrifuge media separator 30 may be utilized or incorporated into blast cabinets 10 and other similar devices of differing configurations.

The media in the blast cabinet 10 is generally comprised of blast particulate 18 and fine particulate 20. Although the mass of the blast particulate 18 may vary between lower and higher masses, the centrifuge media separator 30 separates the blast particulate 18 from the fine particulate 20 in order to purge the fine particulate 20 from an interior of the blast cabinet 10 so as to increase the visibility of a workpiece (not shown) being blasted by a pressure hose (not shown) within the blast cabinet.

As shown in FIGS. 2-5, the centrifuge media separator 30 may be specifically configured to separate blast media. To achieve the separation of the blast particulate 18 and the fine particulate 20 the outer wall may include an escape aperture 44 which may operate in combination with an adjustable air foil 50. The air foil 50 may direct a portion of the high pressure, high velocity fluid toward the escape aperture 44. The portion of the high pressure, high velocity fluid being directed toward the escape aperture 44 may be controlled by adjusting the air foil as is described in greater detail below.

A portion of the high pressure, high velocity fluid may carry blast particulate 18. Another portion of the high pressure, high velocity fluid may carry fine particulate 20. The air foil 50 may be adjusted in the direction indicated by the arrow in FIG. 3, so that the portion of the high pressure, high velocity fluid carrying the blast particulate 18 may be directed by the air foil 50 to the escape aperture 44 to enable separation of the blast particulate 18 from the fine particulate 20. Separation of the blast particulate 18 from the fine particulate 20 allows for reclaiming or recycling of the blast particulate 18 through the blast cabinet 10 in order to lower operating costs.

Figure 2:
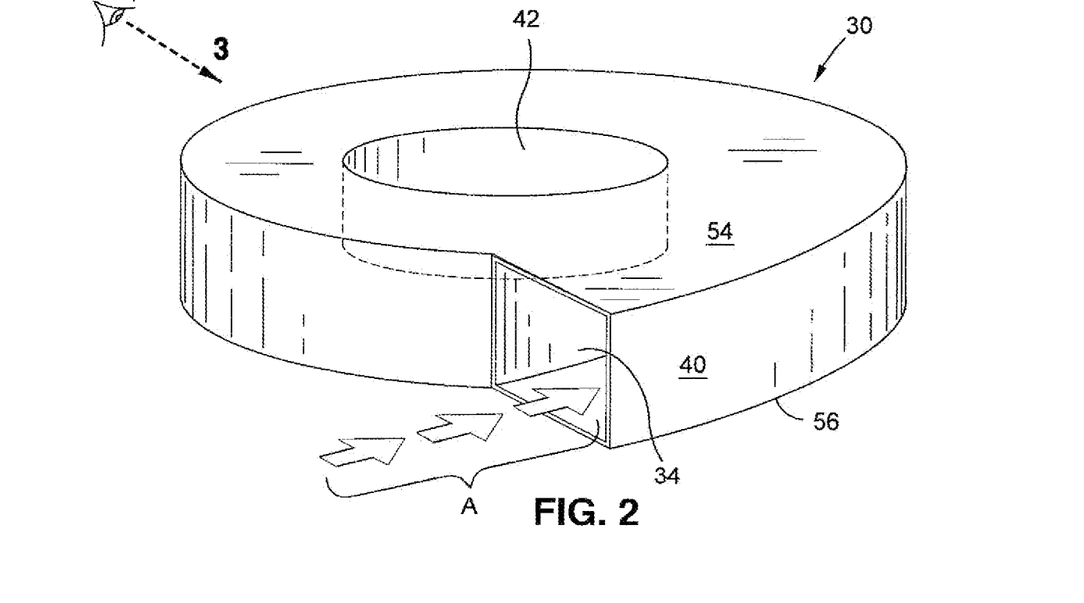
FIG. 2 is a perspective view of the centrifuge media separator having a spiral configuration for centrifugally directing blast particulate to an outer wall of the media separator.
Figure 3:
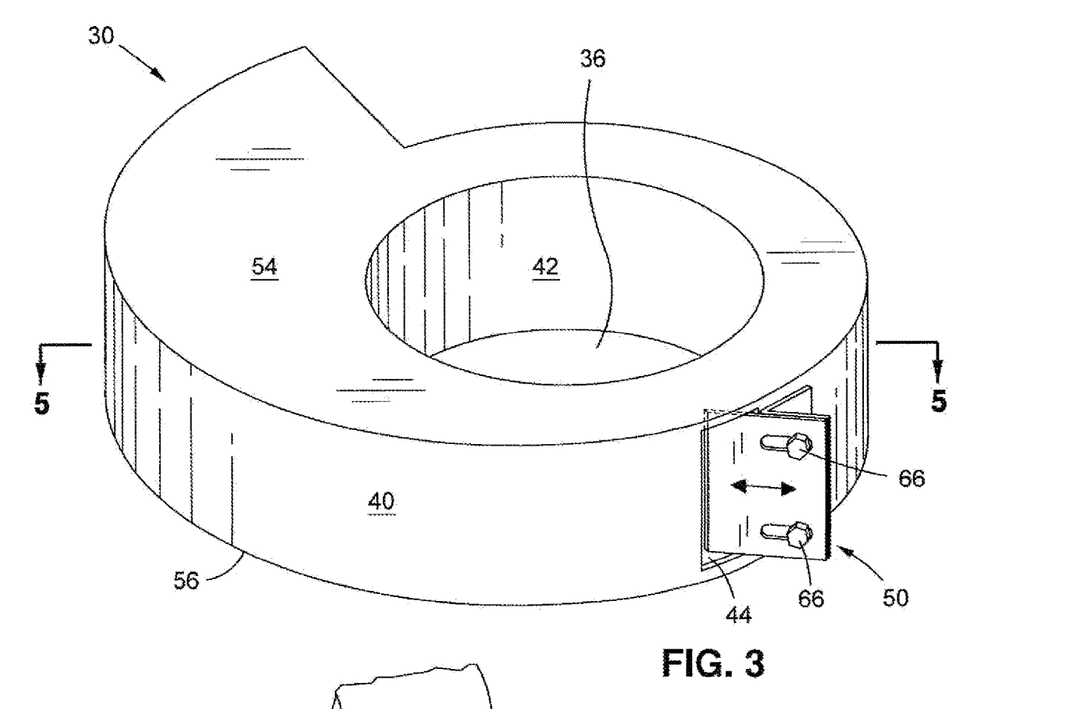
FIG. 3 is a perspective view of the centrifuge media separator along sight line 3 in FIG. 2, including the air foil placed in the escape aperture.

As shown in FIGS. 2 and 3, the centrifuge media separator 30 may include a top panel 54, a bottom panel 56, an inner wall 42, and an outer wall 40. The outer wall 40 may extend between the top and bottom panels 54, 56, and this orientation creates an outer surface and inner surface of the outer wall 40. The outer wall 40 may surround the inner wall 42. The inner wall 42 may include a top edge and a bottom edge. The top edge may be attached to the top panel 54, such that the inner wall 42 extends partially downwardly from the top panel 54. The bottom edge of the inner wall 42 and the bottom panel 56 may define a gap. In this regard, the inner wall 42 may extend downwardly about one-quarter to about one-third of an overall height of the centrifuge media separator 30 although the inner wall 42 may extend downwardly in any amount. The inner wall 42 further defines a central opening 36 in the top and bottom panels 54, 56. The overall height of the centrifuge media separator 30 is defined by a distance between the top and bottom panels 54, 56. By including the inner wall 42 with the centrifuge media separator 30, the operating efficiency thereof may be improved.

Figure 9A:
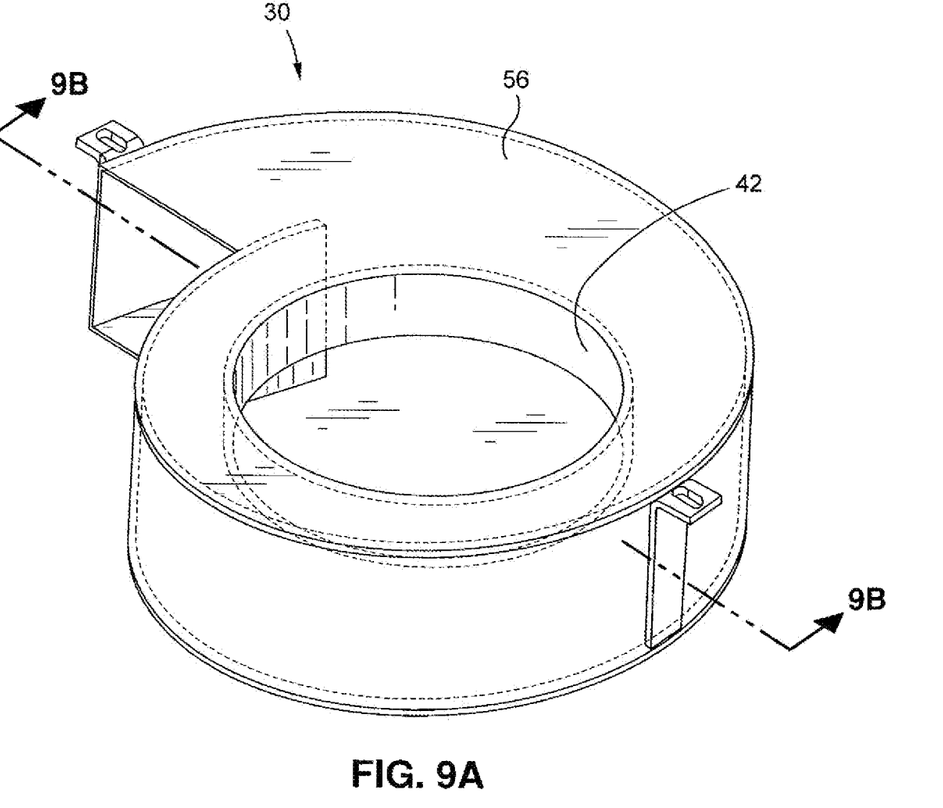
FIG. 9A is a perspective of a centrifuge media separator showing the bottom panel, inner wall, and central opening.
Figure 9B:
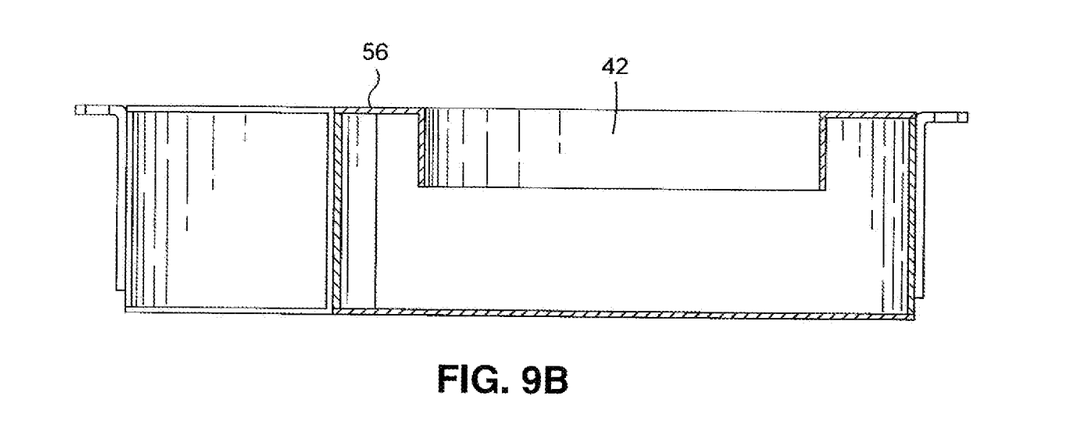
FIG. 9B is a side cross sectional view of the centrifuge media separator of FIG. 9A.
Figure 10A:
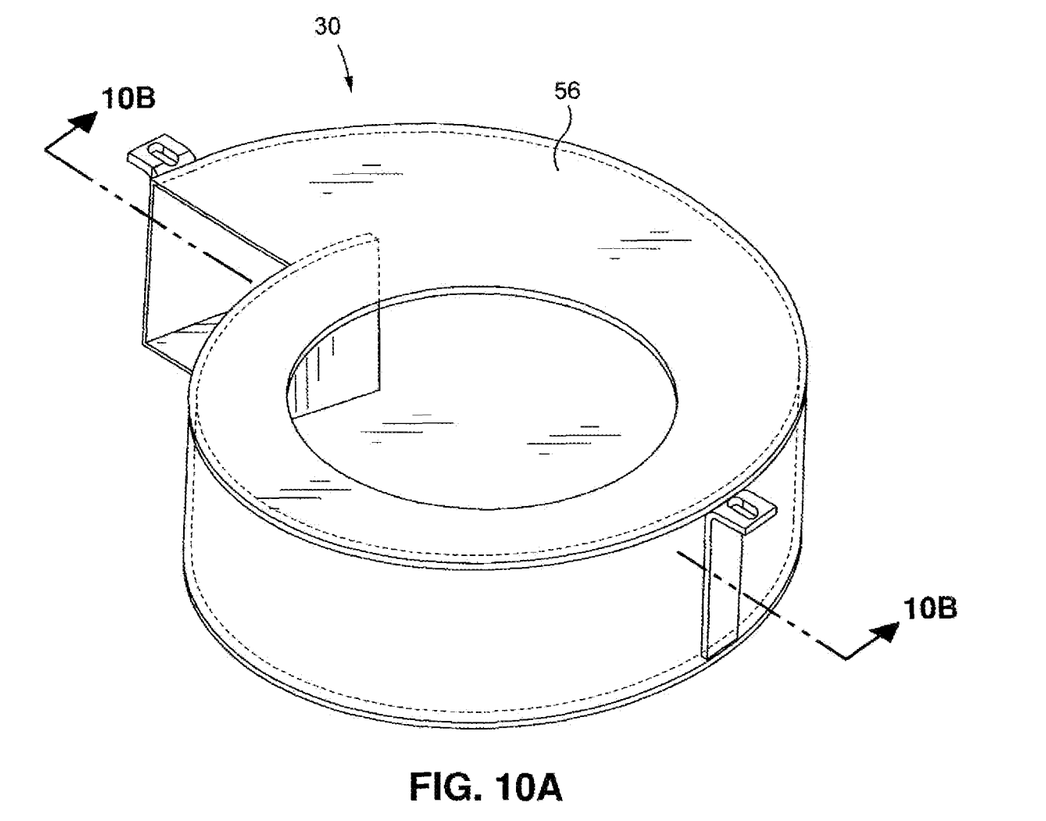
FIG. 10A is a perspective view of a centrifuge media separator showing the bottom panel and central opening.
Figure 10B:
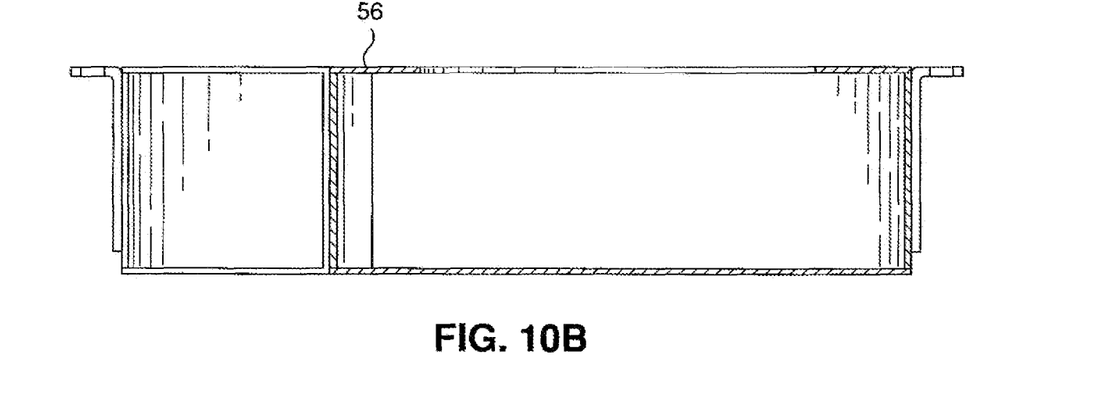
FIG. 10B is a side cross sectional view of the centrifuge media separator of FIG. 9A.

Alternatively, as shown in the centrifuge media separator 30 of FIGS. 9A and 9B, the bottom edge of the inner wall 42 may be connected to the bottom panel 56. When the bottom edge of the inner wall 42 may be connected to the bottom panel 56, the top edge of the inner wall 42 and the top panel 54 may form a gap. As shown in FIGS. 10A and 10B, the centrifuge media separator may have no inner wall 42. Regardless of whether the inner wall extends from the top panel 54 or the bottom panel 56, the presence of an inner wall 42 will improve the efficiency of the centrifuge media separator 30. That is, the higher the efficiency only increasingly smaller particles will be returned to the dust collector.

The top panel 54, bottom panel 56, inner wall 42, and outer wall 40 may collectively form an air passageway through which the blast media may be drawn by a low pressure source 52 such as a blower mounted on the blast cabinet 10. The centrifuge media separator 30 is fluidly connected to an interior 12 of the blast cabinet 10. The low pressure source 52 is fluidly connected to the central opening 36 and is configured to draw air into the inlet 34 and exhaust air through the central opening 36. In this manner, the blast media may be drawn upwardly from the interior 12 and into the air passageway 32 wherein the blast particulate 18 may be separated from the fine particulate 20. Optionally, a filter 22 may be provided with the blast cabinet 10 to filter excess amounts of fine particulate 20 leaving the air passageway 32 prior to exhaustion out of the blast cabinet 10. The blower may be mounted on the blast cabinet 10 above the centrifuge media separator 30. The blower is configured to ventilate the interior 12 by providing low pressure in an area surrounding the centrifuge media separator 30. The low pressure provided by the blower draws spent portions of the blast media into the centrifuge media separator 30 for subsequent separation into blast particulate 18 and fine particulate 20.

The inlet 34 of the passageway may be rectangular shaped due to the orthogonal relation of the top and bottom panels 54, 56 and the outer wall 40. Similarly, the outlet 38 may also be partially rectangular shaped due to the orthogonal relation of the top and bottom panels 54, 56, the outer wall 40 and inner wall 42. However, the inlet 34 may be configured in a variety of alternative shapes as may be provided by including an inlet 34 extension of, for example, cylindrical shape. Similarly, the outlet 38 configuration may be generally determined by the shape of the upper and lower panels 54, 56 and the shape of the outer and inner walls 40, 42. The inlet 34 is configured to allow a flow of air to enter the air passageway 32 and circulate therethrough toward the outlet 38.

Figure 5:
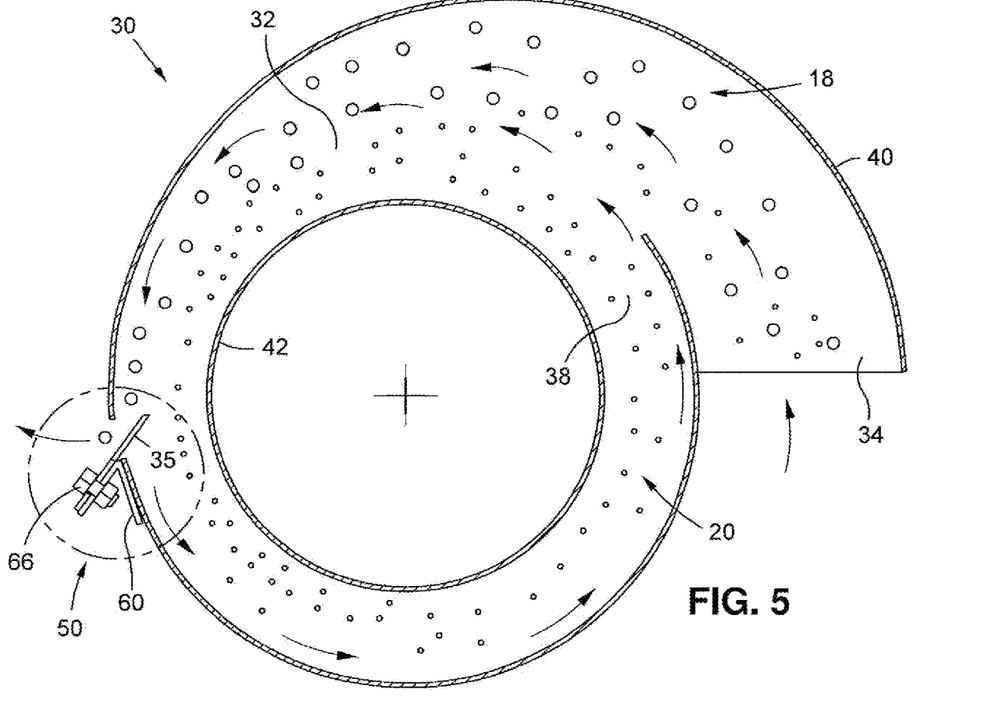
FIG. 5 is a cross sectional view of the centrifuge media separator at the line 5-5 of FIG. 3.

As can be seen in FIGS. 2 and 5, the air passageway 32 is preferably configured such that a cross sectional area thereof generally decreases along a direction of the flow. Due to the truncated logarithmic spiral shape of the outer wall 40, and correspondingly, the passageway, the outlet 38 is disposed radially inwardly relative to and positioned downstream of the inlet 34 such that the flow of air enters the inlet 34, circulates through the air passageway 32, exits the outlet 38, and rejoins the flow of air entering the inlet 34. The escape aperture 44 is configured to exhaust the blast particulate 18 out of the passageway. The central opening 36 is configured to exhaust the fine particulate 20 out of the passageway when the low pressure source 52 is applied to an area surrounding the central opening 36 in the top panel 54, as will be described in greater detail below. The centrifuge media separator 30 may be manufactured from material selected from the group consisting of wood, plastic, metal, stainless steel, steel, or other suitable material and any combination thereof.

The outer wall 40 may include at least one particulate escape aperture 44 formed therein such that the blast particulate 18 may be exhausted from the air passageway 32 for subsequent recycling through the blast cabinet 10. The escape aperture 44 may extend the entire height of the outer wall 40, may extend more than three quarters of the height of the outer wall 40, or more than half of the height of the outer wall 40. The width of the escape aperture 44 may vary. By way of example and not limitation, the escape aperture 44 may be as little as ¹⁄₆₄ inch or small and as much as 1¼ inch or larger. Other configurations are also contemplated.

The outer wall 40 may include an air foil 50 mounted thereon on a downstream side of the escape aperture 44. The air foil 50 may be configured to create a local area of high pressure adjacent the escape aperture 44. The air foil 50 may vary aspects of the escape aperture 44. By way of example and not limitation, the air foil 50 may extend in to the air passageway 32 to change the shape of the escape aperture 44, or may change the width of the escape aperture 44, or both, as described in detail below.

Figure 6:
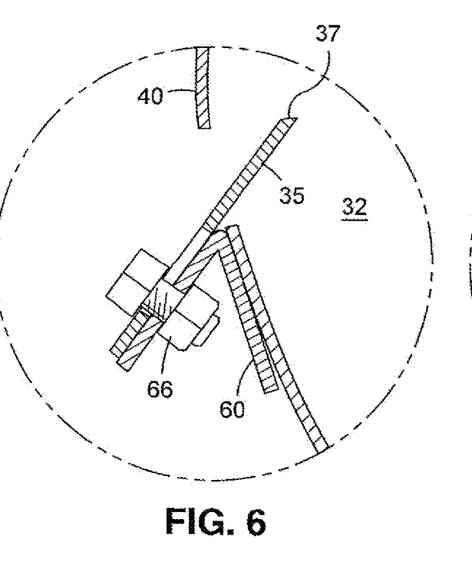
FIG. 6 is a detail view of the air foil, escape aperture, and bracket of FIG. 5 with the air foil in the maximum position.
Figure 7:
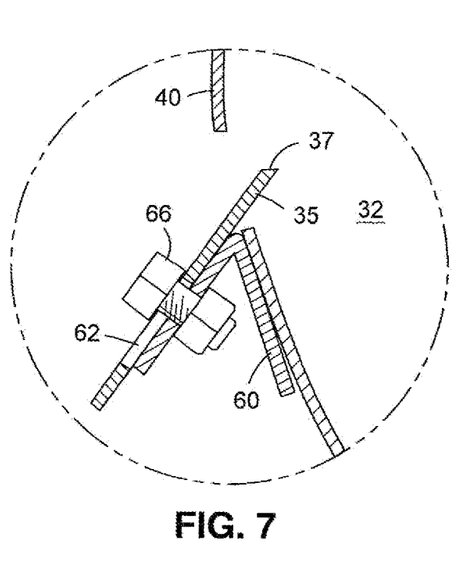
FIG. 7 is a detail view of the air foil, escape aperture, and bracket of FIG. 5 with the air foil in the minimum position.

As shown in FIGS. 3-7, the air foil 50 may extend generally radially inwardly toward the central opening 36 and may span a distance between the upper and lower panels 54, 56. More specifically, the air foil 50 may be angled inwardly in a direction generally opposite that of a direction of flow from the inlet 34 to the outlet 38. The direction of flow into the inlet 34 and within the air passageway 32 is indicated in FIG. 2 by the arrow A. As shown in FIGS. 5-7, the air foil 50 may be oriented at an angle of about forty-five degrees relative to a tangent of the outer wall 40 at a location from which the air foil 50 may extend. However, it is contemplated that the air foil 50 may be provided in a variety of alternative configurations, including angles between 50 and 55 degrees. Due to its shape and orientation in the air passageway 32, the air foil 50 may be configured to facilitate exhaustion of the blast particulate 18 through the escape aperture 44. The air foil 50 may be a separate component that is mounted on the outer wall 40. Alternatively, the air foil 50 may be integrally formed with the outer wall 40.

Figure 4:
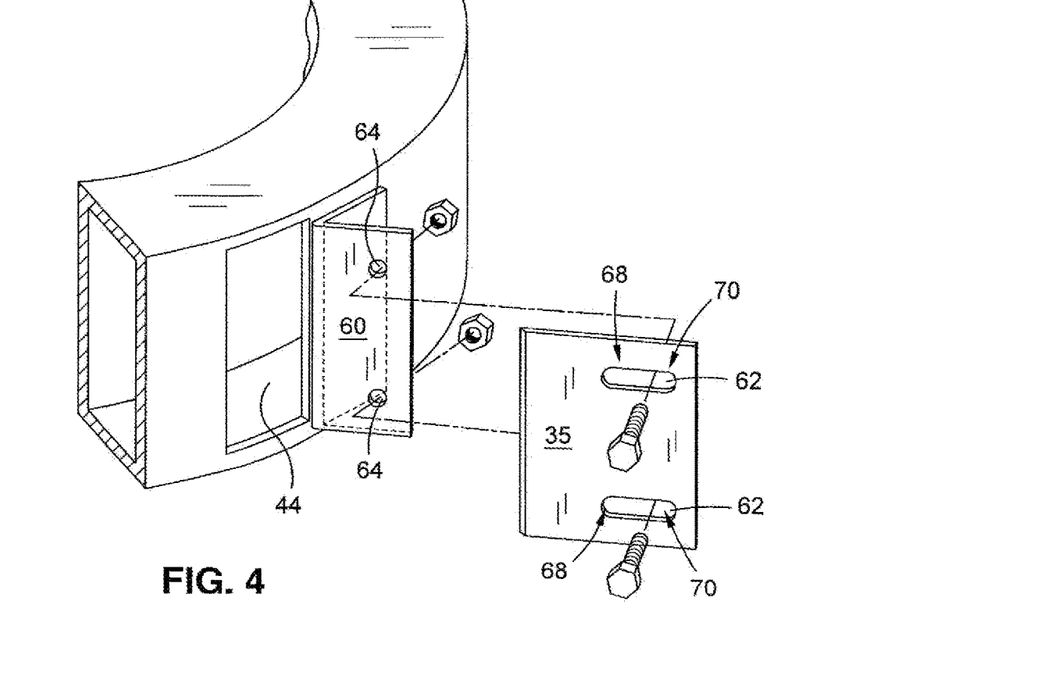
FIG. 4 is an exploded detail perspective view of the air foil, escape aperture, and bracket of FIG. 3.

The air foil 50 may include a bracket 60, for example an angle bracket, attached to an outer surface 41 of the outer wall 40, a blade 35, and one or more mechanical fasteners 66. The bracket 60 may have two sections joined along an edge, forming a "V"-shaped transverse cross section. The bracket 60 may be joined to the outer surface of the outer wall on a face of one of the two sections. Alternatively, the bracket 60 may be joined to the outer surface of the outer wall along two free ends of the sections. The bracket 60 may be oriented at an angle of about forty-five degrees relative to a tangent of the outer wall 40 at a location from which the bracket 60 may be attached. However, it is contemplated that the bracket 60 may be provided in a variety of alternative configurations. Additionally, the bracket 60 may be attached to the outer wall 40, or top or bottom panels 54, 56.

The blade 35 may include a number of adjustment slots 62. The bracket 60 may include the same number of holes 64. Using the adjustment slots 62 and holes 64, the blade 35 may be fixed to the bracket 60 using the one or more mechanical fasteners 66. The adjustment slots 62 may have a first end 68 and a second end 70. As shown in FIG. 7, when the blade 35 is fixed to the bracket 60 with the one or more mechanical fasteners 66 located at the first end 68, the blade 35 is at a minimum extension in to the passageway 32. At the minimum extension, the blade 35 may direct only the blast particulate 18 with the greatest mass through the escape aperture 44. As shown in FIG. 6, when the blade 35 is fixed to the bracket 60 with the one or more mechanical fasteners 66 at the second end 70, the blade 35 is at a maximum extension in to the passageway 32. The blade 35 may also be fixed to the bracket 60 at any point in between the first end 68 and the second end 70 of the adjustment slots 62. When the blade 35 is set at points beyond the minimum, the air foil 50 may direct blast particulate 18 of decreasing mass through the escape aperture 44, while still allowing the fine particulate 20 to continue to the outlet 38.

The blade 35 may also include a leading edge 37 which is tapered relative to front and rear faces of the blade 35. The taper on the leading edge 37 may help to create the area of high pressure adjacent to the escape aperture 44. When the blade 35 is attached to the bracket 60 using the mechanical fasteners 66, the taper on the leading edge 37 may present a relatively flat surface to the air flow as opposed to an angled surface. The taper may be created by a shorter front face of the blade and a longer rear faces of the blade 35.

The one or more mechanical fasteners 66 may create a friction connection between the one or more fasteners 66, the blade 35, and the bracket 60, preventing the blade 35 from moving relative to the bracket 60. By way of example and not limitation, the one or more mechanical fasteners 66 may include a nut and bolt combination including various types of nuts, for example standard hexagonal nuts and wing nuts, or holding screws that engage threads on the angle bracket holes. Alternatively, the blade 35 and bracket 60 may be attached by any removable means which prevent the blade 35 and bracket 60 from moving relative to one another.

Figure 8A:
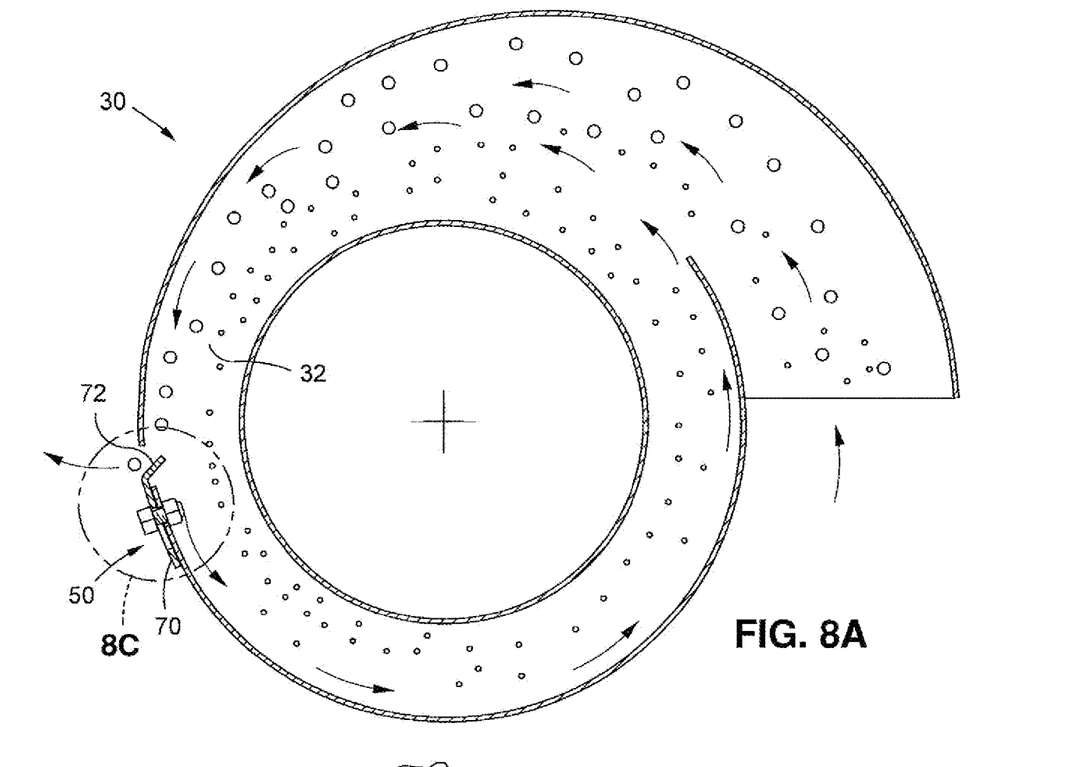
FIG. 8A is a top cross section view of a centrifuge media separator with an alternative air foil.
Figure 8B:
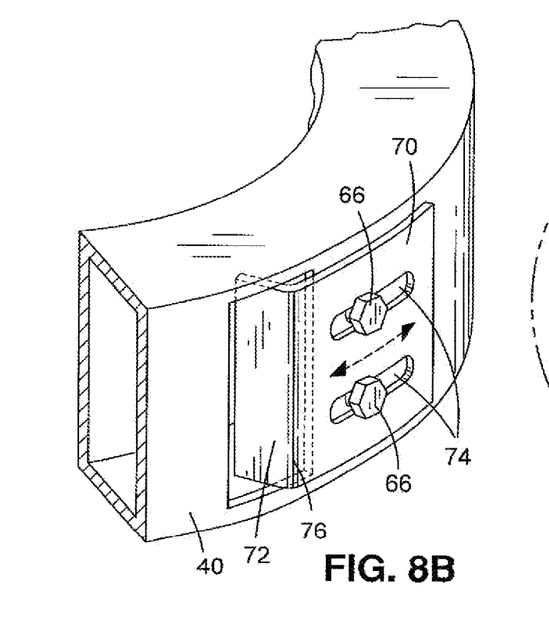
FIG. 8B is a detail perspective view of the alternative air foil of FIG. 8A.
Figure 8C:
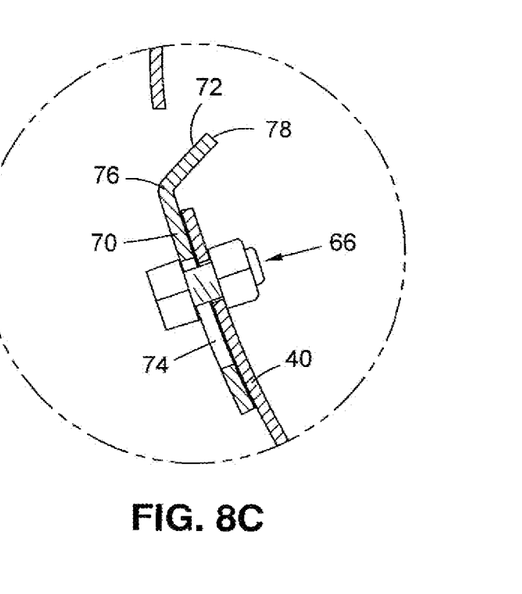
FIG. 8C is a detail top view of the alternative air foil.

Alternatively, as shown in FIGS. 8A, 8B, and 8C the air foil 50 may include two sections, a base section 70 and a blade section 72. The base section 70 may include adjustment slots 74. The adjustment slots 74 may have a longitudinal axis substantially parallel to a top edge and a bottom edge of the outer wall 40. A mechanical fastener 66 may be disposed in each of the adjustment slots 74. The each of the mechanical fasteners 66 may attach to the outer wall 40 of the centrifuge media separator 30. Alternatively, the mechanical fasteners 66 may pass through both the adjustment slots 74 and the outer wall 40 and have two pieces which compress the base section 70 and outer wall 40 in between the two pieces of the mechanical fastener 66. For example, the mechanical fastener 66 may be a nut and bolt with the bolt on the inside of the outer wall 40 and the nut compressing against the base section 70. The head of the bolt or nut may be disposed on the side of the blade section 72 opposite the air flow, indicated by the arrows in FIG. 8A, in the air passageway 32. The placement of the head of the bolt or nut behind the blade section 72 prevents wear on the head of the bolt or nut from the impact of particles. The mechanical fasteners 66 may be loosened and the base section 70 moved so that the air foil 50 changes the width of the escape aperture 44. Adjusting the width of the escape aperture 44 changes the efficiency of the centrifuge media separator 30. Again, the narrower the escape aperture 44, the smaller the particle that is sent to the dust collector.

The blade section 72 may form a common edge 76 with the base section 70. The blade section 72 may have a fixed width from the common edge 76 to a free edge 78 of the blade section 70. The fixed width means that the blade section 72 will extend to a fixed depth in the air passageway 32.

Because the blade 35 or the blade section 72 and base section 70 are removeably attached, they may be replaced when they experience wear. The ability to replace worn blades 35 or air foil 50 with the blade section 72 and base section 70 means that the centrifuge media separator 30 will not experience a large drop in efficiency because of the wear to the parts.

Alternatively, there may be no air foil 50 in the escape aperture 44. The configuration including no air foil 50 may function well for low efficiency applications with large, heavy abrasives. The escape aperture 44 in this configuration may be from ¼ inch to 1.5 inches, with ¾ inch to 1 inch being preferred. The heavy abrasive may have enough momentum to continue on a path defined by a tangent to the curve of the outer wall 40 at the near side of the escape aperture 44. The curve of the outer wall 40 may allow the abrasive to pass through the escape aperture 44 on the path of the tangent.

In use, the centrifuge media separator 30 may be attached to the blower as mentioned above. The blower creates an area of low pressure adjacent the central opening 36. The area of low pressure draws air into the inlet 34. As was earlier mentioned, the air contains a combination of blast particulate 18 and fine particulate 20. Because the centrifuge media separator 30 is configured such that the air passageway 32 circles about itself, particulate having a density greater than the air (i.e., the blast particulate 18) tends to be centrifugally directed toward the outer wall 40. The blast particulate 18 may circulate within the centrifuge media separator 30 in a sliding manner against the outer wall 40.

When the blast particulate 18 reaches the escape aperture 44, the blast particulate 18 may be directed to the escape aperture 44 by the air foil 50, and exhausted from the air passageway 32. If no blast particulate 18 is exhausted through the escape aperture 44, it may be because the blast particulate 18 has a relatively lower mass, and is travelling in the air flow too far away from the outer wall 40 to be directed to the escape aperture 44 by the air foil 50. The air foil 50, and specifically, the blade 35, may be adjusted by loosening the mechanical fasteners 66 and sliding the blade 35 to extend further in to the passageway 32, then retightening the one or more mechanical fasteners 66. An air foil 50 which extends further in to the passageway 32 will capture lower mass blast particulate. A pressure differential may exist between an inside and outside of the air passageway 32 at an area adjacent the escape aperture 44. As discussed above, the air foil may 50 extend in to the air passageway 32 some distance at an angle. When the air flowing through the air passageway 32 contacts the blade 35, the air will change direction, and the change in direction will reduce the velocity of the air. The reduced velocity air will be at a pressure higher than the air in the air passageway 32 moving at a constant velocity or than air that is accelerating in the air passageway 32. The air exterior to the passageway 32 may have a lower pressure compared to that on the inside of the air passageway 32, and even lower than the air in the vicinity of the air foil 50, such that the blast particulate 18 is drawn to the outside of the air passageway 32. Once outside of the air passageway 32, gravity may draw the blast particulate 18 downwardly into a blast particulate hopper such that the blast particulate 18 can be reused. Thus, the pressure differential between the inside and outside of the air passageway 32 may be increased with the addition of the air foil 50 such that the separating efficiency of the centrifuge media separator 30 is enhanced. The ability to precisely adjust the air foil 50 allows flexibility in the blast particulate 18 the blast cabinet 10 may use.

Downstream of the escape aperture 44, the air circulating through the air passageway 32 may contain fine particulate 20. The air with fine particulate 20 may be drawn through the central opening 36 formed in the upper panel 54 due to the application of low pressure by the blower. The air may pass under and around the inner wall 42 such that it may be drawn upwardly through the central opening 36. The low pressure may be sufficient to draw air with fine particulate 20 through the central opening 36 but not insufficient to draw the blast particulate 18 therethrough. As such, the blast particulate 18 downstream of the escape aperture 44 may be recirculated through the air passageway 32 and redirected back to the inlet 34 such that the blast particulate 18 might pass through the escape aperture 44.

The above description is given by way of example, and not limitation. Given the above disclosure, one skilled in the art could devise variations that are within the scope and spirit of the invention disclosed herein, including various ways of attaching the blade to the bracket. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A blast cabinet for blasting the surface of a workpiece with blast particulate, the blast cabinet comprising:
   a housing;
   blast particulate placed within the housing;
   a centrifuge media separator, including;
   a top panel;
   a bottom panel;
   an inner wall extending downwardly from the top panel;
   an outer wall surrounding the inner wall and extending between the top and bottom panels, the outer wall defining a truncated logarithmic spiral;
   the top panel, the bottom panel, inner wall, and outer wall collectively defining a passageway and a central opening, the passageway having an inlet and an outlet and a transverse cross section which generally decreases from the inlet to the outlet;
   an escape aperture in the outer wall; and
   an air foil adjacent the escape aperture, the air foil including a blade that extends from the outer wall in to the passageway a distance, the blade including at least one adjustment slot, the airfoil including a bracket attached to an outer surface of the outer wall, wherein the blade is attached to the bracket by one or more mechanical fasteners through the at least one adjustment slot to allow the distance of the blade extending into the passageway to be adjusted along the slot.

2. The blast cabinet of claim 1, wherein when the air foil is set further from the outer wall, the air foil directs blast media with less mass through the escape aperture.

3. The blast cabinet of claim 1, wherein the at least one adjustment slot includes a gasket on an interior.

4. The blast cabinet of claim 1, wherein the airfoil extends inwardly toward the central opening and is angled in a direction opposite a direction of airflow through the passageway.

5. The blast cabinet of claim 4, wherein the blade has a leading edge that is tapered relative to front and rear faces of the blade so as to present a surface that faces the airflow.

6. The blast cabinet of claim 1, further comprising a low pressure source fluidly connected to the central opening and configured to draw air into the inlet and exhaust air through the central opening.

7. A blast cabinet for blasting the surface of a workpiece with blast particulate, the blast cabinet comprising:
   a housing;
   blast particulate placed within the housing;
   a centrifuge media separator, including;
   a top panel;
   a bottom panel;
   an inner wall extending downwardly from the top panel;
   an outer wall surrounding the inner wall and extending between the top and bottom panels, the outer wall defining a truncated logarithmic spiral;
   the top panel, the bottom panel, inner wall, and outer wall collectively defining a passageway and a central opening, the passageway having an inlet and an outlet and a transverse cross section which generally decreases from the inlet to the outlet;
   an escape aperture in the outer wall; and
   an air foil adjacent the escape aperture, the air foil including a blade that extends from the outer wall in to the passageway a distance and a bracket attached to a surface of the outer wall, wherein the blade is attached to the bracket by one or more mechanical fasteners through at least one adjustment slot to allow the distance of the blade extending into the passageway to be adjusted along the slot.

8. The blast cabinet of claim 7, wherein when the air foil is set further from the outer wall, the air foil directs blast media with less mass through the escape aperture.

9. The blast cabinet of claim 7, wherein the airfoil extends inwardly toward the central opening and is angled in a direction opposite a direction of airflow through the passageway.

10. The blast cabinet of claim 9, wherein the blade has a leading edge that is tapered relative to front and rear faces of the blade so as to present a surface that faces the airflow.

11. The blast cabinet of claim 7, further comprising a low pressure source fluidly connected to the central opening and configured to draw air into the inlet and exhaust air through the central opening.

* * * * *